United States Patent
Williams

[15] 3,698,208
[45] Oct. 17, 1972

[54] FLEXIBLE COUPLING
[72] Inventor: Charles H. Williams, Export, Pa.
[73] Assignee: Koppers Company, Inc.
[22] Filed: Feb. 2, 1971
[21] Appl. No.: 112,006

[52] U.S. Cl..................................64/11 R, 64/31
[51] Int. Cl.............................................F16d 3/17
[58] Field of Search....................64/11 R, 21, 31

[56] References Cited

UNITED STATES PATENTS

| | | |
|---|---|---|
| 3,606,392 | 9/1971 | Garrett..................64/11 X |
| 1,658,750 | 2/1928 | Weiland....................64/11 |
| 3,531,949 | 10/1970 | Downey....................64/11 |

*Primary Examiner*—Kenneth W. Sprague
*Attorney*—Fred C. Trenor, Oscar B. Brumback and Olin E. Williams

[57] ABSTRACT

A flexible coupling for two generally coaxially arranged shafts has a hub for each shaft, a flexible means disposed between and securely fixed to the hubs for tolerating axial misalignment between the shafts and a rigid means coaxially disposed between and loosely attached to the hubs for limiting axial movement of the hubs in respect of each other.

5 Claims, 5 Drawing Figures

PATENTED OCT 17 1972 3,698,208

INVENTOR.
CHARLES H. WILLIAMS

Fred C. Trenor, II
Agent

FLEXIBLE COUPLING

BACKGROUND OF THE INVENTION

This invention relates generally to flexible couplings for transmitting rotary motion between two generally aligned shafts.

A slight axial misalignment of two generally aligned shafts that are to be coupled together is common. The support bearings for the shafts rarely hold the shafts in perfect alignment. To prevent severe stresses from developing in the shafts during rotation and to prevent undue loading of the support bearings of the shafts from developing during rotation the shafts are coupled by couplings which assume these stresses. Couplings which are capable of assuming these stresses are commonly referred to as flexible couplings.

Attempts have been made, heretofore, to make flexible couplings from non-metallic, resilient, elastomeric materials because of the advantages of these types of couplings. For example, couplings using elastomeric materials do not require lubrication; they are economical to manufacture; and, they are torsionally resilient. Frequently, the connected shafts are subject to shock loads, that is, a load applied very suddenly. The nature of the coupling determines the extent to which the shock is transmitted from one shaft to the other. Hence, resilient couplings are especially attractive for applications where a minimum transmission of the shock loads from one shaft to the other shaft is desired because the flexible coupling absorbs the sudden load to prevent its transmission between the shafts.

DESCRIPTION OF THE PRIOR ART

U.S. Pat. No. 3,296,827 describes a resilient coupling which is capable of assuming the stresses developed by axial misalignment and of assuming the stresses due to shock loads. The coupling of U.S. Pat. No. 3,296,827 has two hubs between which an elastomeric polygonally-shaped ring is disposed. The elastomeric ring has alternate elastomeric arms extending forwardly and rearwardly of the ring. These alternate arms have metal lugs within them which are secured to the respective hubs.

It has been observed, however, that the coupling of U.S. Pat. No. 3,296,827 is not only subjected to stresses of misalignment and shock loading, but also is subjected to forces which tend to pull the respective hubs of the coupling apart from one another. Consequently, the intended life of this coupling has been shortened because of the hubs moving axially away from one another causing the elastomeric arms of the elastomeric ring to tear from the metal lugs holding the ring between the hubs. The present invention is an improvement over the resilient coupling of U.S. Pat. No. 3,296,827 which prevents the elastomeric arms from pulling away and tearing from their metal lugs.

SUMMARY OF THE INVENTION

In accordance with the invention a flexible coupling for two generally coaxially arranged shafts comprises a hub for each shaft, a flexible means disposed between the hubs for tolerating axial misalignment, and a rigid means coaxially disposed between the hubs for limiting the axial movement of the hubs in respect of each other. The hub includes a shank portion and a flange portion of larger diameter than the shank portion.

The flexible means comprises a series of rectilinear resilient and compressible columns that are arranged with their longitudinal axes along the sides of a flat polygon with an arm extending transversely from the longitudinal axes at each intersection of two adjacent columns. Alternate arms extend forwardly and rearwardly in respect to the flat polygon. A means for securely attaching the arms to the flange of the hub and for decreasing the radius of the polygon so as to place the columns under a compressive load are provided.

In one embodiment the rigid means comprises a sleeve having a pair of axially spaced apart circumferentially arranged ribs projecting radially inwardly of the sleeve from the inside cylindrical surface of the sleeve. The shank portion of the hub has an outer circumferential groove thereon for cooperation with a respective one of the cooperating ribs. The groove has a width that is greater than the width of a cooperating rib so that misalignment may be tolerated, yet axial movement of the hubs in respect of each other is limited.

In another embodiment the rigid means comprises a sleeve having a pair of axially spaced apart circumferentially arranged grooves on the inside cylindrical surface of the sleeve. Each of the shank portions of the hub has a matching circumferentially arranged outer groove thereon for cooperation with the respective one of the grooves of the sleeve. A retaining ring is disposed in the space defined by both matching grooves of the shank portion of the hub and of the sleeve. The retaining ring has a body diameter less than the diameter defined by both of the cooperating grooves so that axial misalignment may be tolerated yet axial movement of the hubs in respect of each other is limited.

GENERAL DESCRIPTION OF THE DRAWINGS

DETAILED DESCRIPTION OF THE INVENTION

Figure 1:
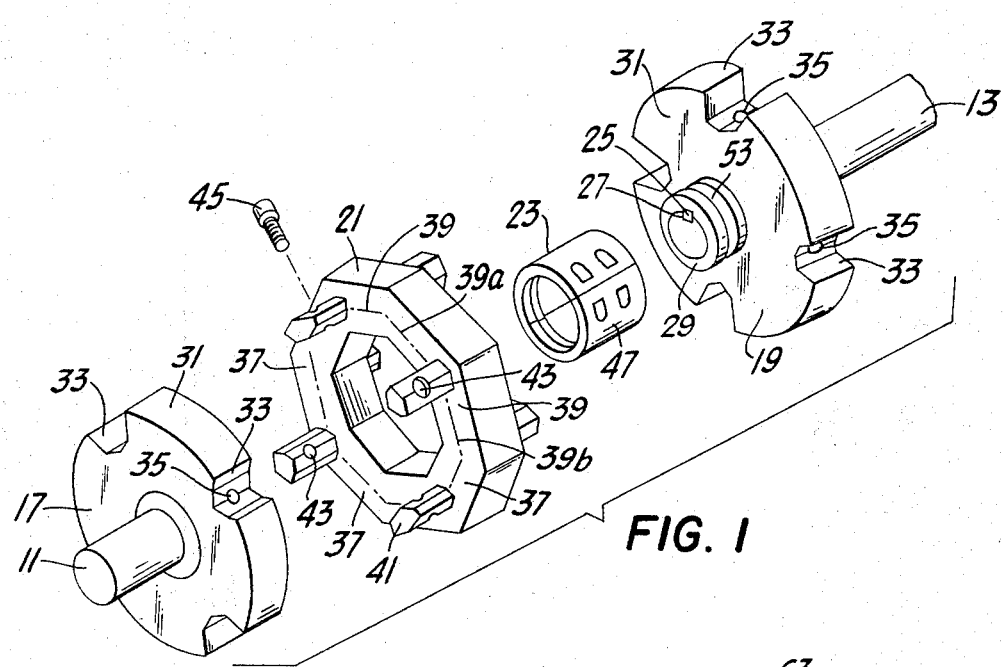
FIG. 1 illustrates an exploded isometric view of the flexible coupling of this invention.

In FIG. 1 a pair of generally axially arranged and substantially abutting shafts 11 and 13 are to be coupled in a torque transmitting relationship by the novel coupling, denoted generally at 15. The flexible coupling 15 has hubs 17 and 19 for each of the respective shafts 11 and 13, a flexible means 21 coaxially disposed between the hubs 17 and 19, and a rigid means 23 coaxially disposed between the hubs 17 and 19. As illustrated herein, hubs 17 and 19 are mounted on shafts 11 and 13 respectively by a key 25 in keyways 27 of both the shafts 11 and 13 and the hubs 17 and 19.

Hubs 17 and 19 have a shank portion 29 and a flange portion 31 of a larger diameter than the shank portion 29. Each hub 17 and 19 has wedge-shaped slots 33 disposed on the flange portion 29 of each hub at equally spaced apart locations. A centrally located threaded aperture 35 exists in each slot 33.

The flexible means 21, being fully described in U.S. Pat. No. 3,296,827, comprises an elastomeric ring having a series of rectilinear, resilient and compressible columns 37 arranged with their longitudinal axes 39 on the sides of a regular polygon. Lugs 41 extend from the polygon and are positioned at the point of intersection of the axes of two adjacent columns, such as 39a and 39b, and the lugs 41 extend transversely of the longitudinal axes 39 of the columns 37. The lugs 41 are bonded within the longitudinal column 37 and are substantially the same width as the cross sectional area of the columns. It is preferred that the lugs be completely encapsulated in the resilient material of the columns to assume a sound bond of the lugs 41 thereto.

The lugs 41 are adapted to fit into the slots 33 and the lugs are wedge-shaped to conform to the slots 33. Each lug includes an aperture 43 through which a cap screw 45 or the like may extend for threading into the aperture 35 of the slots 33.

As illustrated herein the lugs 41 and the columns 37 are an integral unit; the lugs are mounted in the columns 37. This has the advantage that the resulting flexible means 21 is one piece, is easily and cheaply made, and more importantly, it is readily handled and installed.

The lugs 41 extend, alternately, first from one side of the flexible means 21 and then from the other side as illustrated in FIG. 1. In the embodiment illustrated herein four lugs extend in one direction from one side of the flexible means 21 and four lugs extend from the other side of the flexible means 21. The lugs 41 on each side are spaced 90° apart so that the distance between adjacent lugs is 45°; however, three lugs extending from each side of the flexible means 21 may be used and disposed apart by 120° on couplings that are small in size so that the distance between adjacent lugs is 60°. These lugs 41 attach the flexible means 21 in a staggered fashion to the hubs 17 and 19. The distance or radius of these lugs 41 from the axis of the flexible means is 10 to 20 percent greater than the distance or radius of the apertures 35 from the axis of the shafts 11 and 13. As lugs 41 fit into the slots 33 of hubs 15 and 17 they decrease the diameter of the flexible means 21 and thus compress the flexible means 21. The lugs are preferably made of a metal such as, for example, aluminum or steel for strength. Metal lugs can also be conveniently bonded to material from which the flexible means is made.

Figure 5:
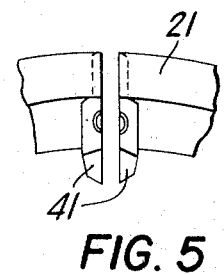
FIG. 5 is a detail of the split lug of the flexible means of FIG. 1.

A further feature of the flexible means, particularly as shown in FIG. 5, is that one of the lugs 41 is split along a radially extending plane, passing through the center of the lug. This permits the flexible means to be spread apart so that it may be installed around shafts that are coupled very closely. Even when the shafts were not closely coupled, because of the nature of the coupling used, it has been necessary, heretofore, to back off the shafts in order to mount a flexible means to the coupling hubs. The novel split coupling overcomes the foregoing problem as the flexible means can be opened to be placed upon or removed from a shaft or coupling unit. This feature of the split flexible means enables the application of the coupling under conditions where it had been necessary heretofore to back one shaft away from the other in order to install the coupling.

The flexible means 21 is made of a resilient material, preferably from material such as, for example, rubber, which is deformable under a compressive force. A plastic, such as polyurethane, may also be used if desired. The nature of the resilient compressible material of course, will vary with the requirements of the operation. Advantageously, the rubber from which the flexible means is made has a Shore A durometer hardness of 55 to 65. If the material is too soft it will deform too much, and if it is too hard it will impose bearing loads on the shafts 11 and 13 that are intolerable.

Figure 2:
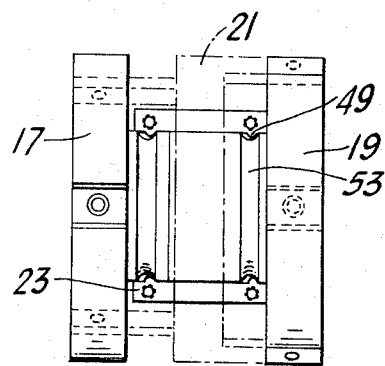
FIG. 2 illustrates a side view of the coupling of FIG. 1 wherein the flexible means of the coupling is illustrated in phantom lines.
Figure 3:
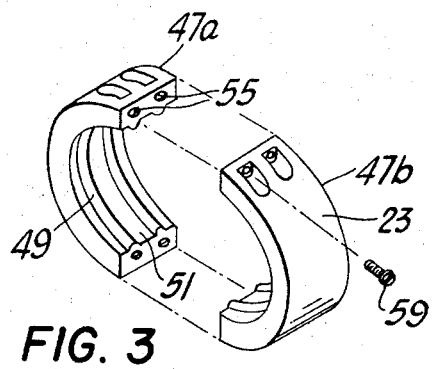
FIG. 3 is an exploded isometric view of the rigid means of the flexible coupling of FIGS. 1 and 2.

In FIGS. 2 and 3, and in accordance with the invention, the rigid means 23 of the flexible coupling 15 is illustrated. The rigid means 23 comprises a rigid sleeve 47 having a width sufficient to span the distance between the hubs 17 and 19. The sleeve 47 has a pair of projecting ribs 49 that are axially spaced apart and that are circumferentially arranged projecting radially and inwardly from the inside cylindrical surface 51 of the sleeve 47. The projecting ribs 49 are adapted to cooperate with an outer circumferential groove 53 that is disposed on the shank portion 29 of the hubs 19 and 17. The groove 53 of FIG. 1 has a width that is greater than the width of the cooperating rib 49 as illustrated in FIG. 2. Thus, the rigid means 23 of the flexible coupling 15 is capable of tolerating axial misalignment, from which the stresses are absorbed by the flexible means 21. Yet the rigid means 23 limits the amount of axial movement of hubs 17 and 19 in respect of each other. The sleeve 47 being axially disposed between the hubs 17 and 19 limits the amount of axial movement of the hubs in coming together as well as pulling apart, thereby relieving the axial stresses that otherwise would be imposed upon the flexible means 21.

As illustrated in FIG. 3 the sleeve 47 is constructed of two sections 47a and 47b. This arrangement is desirable for easy assemblying of the flexible coupling of this invention without disturbing shafts 11 and 13. Each section 47a and 47b has at least one threaded bore 55 that passes through two parallel common chords of both the sections 47a and 47b so that the bores 55 in each section are matching and complementary. A cap screw 59 or the like extends through each of the bores 55 at each section 47a and 47b for holding the sections of the sleeve together.

The sleeve 47 may be composed of a metal, such as, for example, steel or aluminum. In applications where it is desirable to prevent electricity from being conducted from one shaft to the other, the sleeve 47 is composed of a nonconducting material, such as, for example, polyurethanes, high density polyethylenes and the like.

In the operation hubs 17 and 19 are placed upon shafts 11 and 13 and secured thereto by keys 25 and keyways 27. Shafts 11 and 13 are then placed in a coaxial relationship to each other. A first section 47a of the sleeve is then coaxially disposed between the hubs with the projecting ribs 49 being fitted into the outer groove 53 of the shank portion 29 of each hub 17 and 19. The second section 47b is then oppositely placed to the first section spanning the distance between the hubs 17 and 19. The cap screws 59 are tightened into position to securely hold the sleeve sections 47a and 47b together around the shank portion 29 of the flexible coupling 15. The flexible means 21 is then placed between the shafts positioned so that the lugs 41 are mated within the slots 33 in the flange portions of each hub 17 and 19. The cap screws 45 are tightened to position the lugs securely in the flange portion of the hubs. The flexible means is initially from 10 to 20 percent larger in diameter in its free state than in its compressed state when the lugs are secured to the hubs. As the lugs move downwardly to engage the slots in the hub the diameter of the polygon which forms the flexible means is decreased. This means that the material between the lugs is compressed and thereby prestressed in compression.

The foregoing has presented a novel coupling which is readily removed for replacement and repair and which is readily inserted in position in the field. The resilient material of this coupling is under compression; however, it is not placed under compression until the coupling is placed into operation. Thus, no compressive stresses are induced in the coupling during shelf storage. The coupling is noncontinuous to permit easy installation at the site. The coupling is flexible and resilient.

The novel coupling of my invention has several advantages not heretofore possible with conventional flexible couplings. For example, it is well-known that rotating shafts have a tendency to "float," i.e., the shafts, when rotating, move back and forth axially. When the shafts move back and forth axially energy is absorbed thereby reducing the efficiency of torque transmission from one shaft to the other shaft. Consequently, it is necessary to employ thrust bearings which restrain such axial movement of the shafts. When my novel coupling is used the amount of "float" is limited as both shafts will now float as a unit together. Moreover, the wear on the thrust bearings will be reduced.

Another advantage of my novel invention is that the compression of the flexible means of my novel coupling is preserved so that the transmission of torque from one shaft to the other shaft is unaffected.

Another advantage of my novel coupling is that the coupling may be so made that it does not conduct electricity from one shaft to the other shaft if the sleeve is made of a nonconductive material.

The flexible means of the coupling described above is a polygon of octagonal configuration. Other polygons may be used as desired. The columns between the lugs may be curved so that the ring is or approaches a circular configuration, but the performance of a circular configuration, that is, one in which the columns are curved rather than the straight columns of the polygon, is inferior because it is believed that the columns of a round configuration are subjected to eccentric loading which induces buckling at relatively low stresses.

Figure 4:
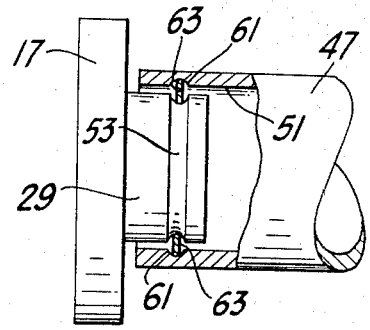
FIG. 4 is a partial side view of another embodiment of the flexible coupling of this invention.

In FIG. 4 another embodiment of the rigid means of the flexible coupling is illustrated. The rigid sleeve 47 has a pair of axially spaced apart circumferentially arranged grooves 61 disposed on the inside cylindrical surface 51 of the sleeve. Each of the hubs 17 and 19 have an outer matching circumferentially arranged groove 53 having a radius which is the same as the radius of the grooves on the sleeve 47. Both grooves 61 and 53 cooperate with one another. A retaining ring 63 is disposed within the space defined by both of the matching grooves 53 and 61 of the sleeve 47 and the hubs 17 and 19. The retaining ring 63 has a body diameter which is less than the diameter defined by both of the cooperating grooves 53 and 61 so that axial misalignment may be tolerated yet axial movement of the hubs in respect of each other is limited.

What is claimed is:

1. A flexible coupling for two generally coaxially arranged shafts comprising:
   a. a hub for each of said shafts; each of said hubs including
      i. a shank portion, and
      ii. a flange portion of larger diameter than said shank portion;
   b. a flexible means for tolerating axial misalignment being coaxially disposed between said hubs and that is securely fixed to each flange of the respective hubs; said flexible means comprises a series of rectilinear resilient and compressible columns arranged with their longitudinal axes along the sides of a flat polygon; and arm extending transversely of said longitudinal axes at each intersection of two adjacent columns; alternate arms extending forwardly and rearwardly with respect to said flange and for decreasing the radius of said polygon whereby the columns are placed under a precompressive load; and
   c. a rigid means coaxially disposed between said hubs and being loosely attached to said shank portion of the respective hubs for limiting axial movement of said hubs in respect of each other.

2. The flexible coupling of claim 1 wherein said rigid means comprises a sleeve having a pair of axially spaced apart circumferentially arranged ribs projecting radially inwardly of said sleeve from the inside cylindrical surface of said sleeve; and, said shank portion of said hubs having an outer circumferential groove thereon for cooperation with a respective one of said cooperating ribs.

3. The flexible coupling of claim 1 wherein said rigid means comprises a sleeve having a pair of axially spaced apart circumferentially arranged grooves on the inside surface of said sleeve; each of said shank portions of said hubs having a matching circumferentially arranged outer groove thereon for cooperation with a respective one of said grooves of said sleeve; and, a retaining ring disposed in the space defined by both matching grooves of shank portion of said sleeve and of said hub; said retaining ring having a diameter less than the diameter defined by both of said cooperating grooves.

4. The coupling of claim 2 wherein said sleeve is constructed of two sections.

5. The coupling of claim 2 wherein each section has at least one threaded bore passing through common chords of both of said sections so that said bores in each section are matching; and, a cap screw extending through said bores of each section for holding said sections of said sleeve together.

* * * * *